United States Patent [19]
Westover

[11] 3,739,932
[45] June 19, 1973

[54] PROTECTIVE HOLDER
[75] Inventor: Virginia Westover, Kentfield, Calif.
[73] Assignee: Chemex Corporation, New York, N.Y.
[22] Filed: Jan. 3, 1972
[21] Appl. No.: 214,672

[52] U.S. Cl. ........ 215/100 A, 16/116 R, D44/26 B, 294/31.2
[51] Int. Cl. .......................................... B65d 23/10
[58] Field of Search ...................... 215/100 A, 101; 294/31.2; 16/116 A, 116 R; D44/1 B, 26 B

[56] References Cited
UNITED STATES PATENTS
| | | |
|---|---|---|
| 2,414,901 | 1/1947 | Schlumbohm .................. 215/100 A |
| 2,705,086 | 3/1955 | Schlumbohm ..................... 215/101 |
| 2,745,569 | 5/1956 | Seaman ...................... 215/100 A X |

*Primary Examiner*—Donald F. Norton
*Attorney*—Robert E. Isner, Peter J. Franco and Spencer T. Smith

[57] ABSTRACT

A protective holder adapted to be positioned proximate the circular neck of a filter-type coffee maker having bowed-in side walls. The holder includes a pair of planar portions each having a concave inner margin. These two portions are joined adjacent their respective concave inner margins and mating fasteners are fastened to these two portions so that the holder can be secured in position about the neck of the coffee maker. The radius of curvature of the joined concave inner margins is selectively chosen to be substantially larger than the radius of curvature of the circular neck of the coffee maker so that when the holder is fitted about the neck of the coffee maker, the two portions of the holder will automatically be displaced from their storage position wherein they are substantially parallel, to their use position wherein they will engage the bowed-in side walls of the coffee maker proximate the neck thereof.

8 Claims, 3 Drawing Figures

PATENTED JUN 19 1973  3,739,932

PROTECTIVE HOLDER

This invention relates to filter type coffee makers and particularly to an improved holder construction therefor.

Filter coffee makers of the type herein of particular concern are conventionally made of one piece glass construction of a configuration approximating that of two vertically disposed truncated cones joined at their apices. Such coffee makers inherently assume the temperature of their contents and require the utilization of an auxiliary holder assumably disposed adjacent the locus of apex joinder to permit relatively comfortable and safe manual handling and manipulation thereof. Among the expedients employed to date are clamped handle members and selectively shaped wooden multi-element holders maintained in interfacial engaged relation with the coffee maker by auxiliary rawhide stripe.

Another expedient is the use of a triangulated napkin secured to the vertex of the coffee maker by means of a specially designed spring clip as described in U.S. Pat. No. 2,705,086.

None of the above expedients comprises a one piece holder assembly that conjointly provides a secure and safe locus for manual engagement with the coffee maker and which is yet readily removable to facilitate cleaning of the unit and the like.

The object of the present invention is to provide an improved holder assembly for filter type coffee makers of resilient one piece construction which can be readily removably mounted about the neck of a filter type coffee maker and which has frictional as well as decorative attributes.

Among the advantages of the present invention is the provision of a readily removable and replaceable decorative holder for filter-type coffee makers that facilitates safe and secure manual engagement therewith and which can be efficiently stored and automatically shaped to conform to the bowed-in configuration of a coffee maker proximate the neck thereof.

Other objects and advantages of the present invention will become apparent from the following portion of this specification and from the accompanying drawings which illustrate, in accord with the mandate of the patent statutes a presently preferred embodiment incorporating the principles of the invention.

Referring to the drawings.

Figure 1:
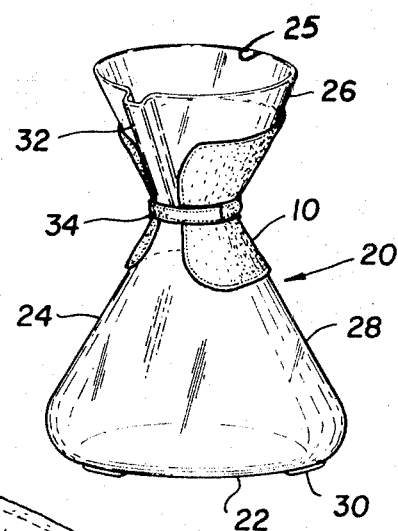
FIG. 1 is a perspective view of a filter-type coffee maker with an improved holder constructed in accordance with the teachings of the present invention secured in the open position about the neck thereof.

Referring to the drawings and initially to FIG. 1, the improved holder 10 is there illustrated mounted on a filter type coffee maker 20 of the general type herein of concern. Such a coffee maker may preferably be constituted by a single piece of heavy walled, hand-blown laboratory glass shaped in the form of an hourglass. Such a coffee maker includes a bottom 22, inwardly tapering or bowed-in side walls 24 and an open top 25. The upper and lower sections are both of a generally truncated conical configuration and are integrally joined adjacent their apices to form the neck portion 34 about which the holder is mountable.

The upper portion 26 of the coffee maker forms a funnel section which supports a filtering element, such as, for example, a filter paper cone (not shown) during the coffee making operations. The lower portion 28 of the coffee maker defines a receptacle or flask for the filtrate which could be, for example, filtered coffee. Three ridges 30 are formed in the bottom of the coffee maker which serve as pedestals to elevate the bottom of the coffee maker away from a supporting heat transfer surface (not shown) whereby, for example, when the coffeemaker is positioned within a water bath the bottom of the bath, which functions as a heat transfer surface, will heat the water which will then circulate under the bottom of the coffeemaker. Such pedestals 30 therefore assure that the heated water, with its low boiling temperature will heat the flask 28 thereby preventing breakage of the coffeemaker which might result if the bottom thereof was heated directly by the high temperature heat transfer surface.

The funnel section 26 includes an elongated groove 32 which extends vertically along the side wall thereof and downwardly past the neck or vertex 34 of the coffeemaker into communication with the lower container portion 28. The groove 32 serves as an air vent allowing air to escape from the flask portion 28 of the coffeemaker thereby assuring that the coffee will be filtered through the filter at the proper rate and also conjointly functions as a pouring spout when coffee is being dispensed therefrom.

Figure 2:
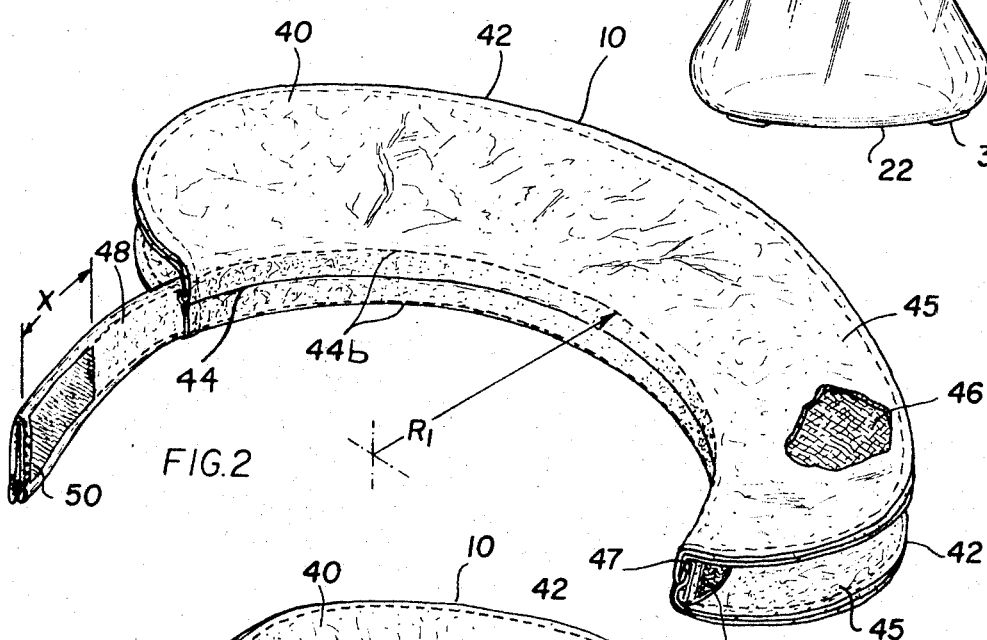
FIG. 2 is a perspective view of the holder illustrated in FIG. 1 in the closed or storage position.
Figure 3:
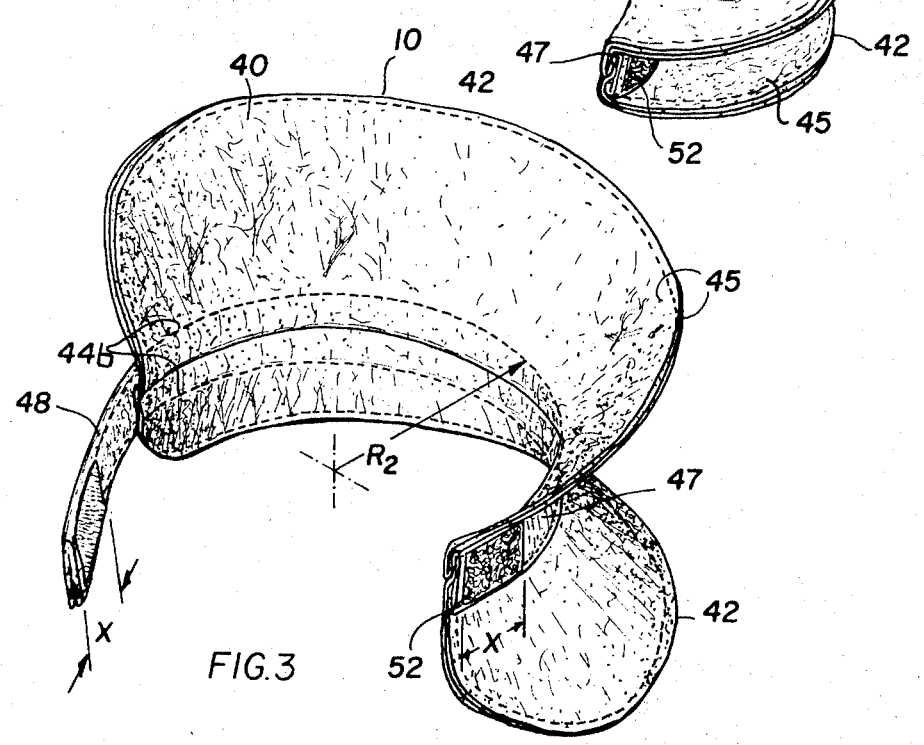
FIG. 3 is a perspective view of the holder illustrated in FIGS. 1 and 2 in a partially open position.

Referring now to FIGS. 2 and 3 the improved holder 10 constructed in accordance with the principles of this invention includes a pair of surface engaging elements 40, which may as illustrated be complementally shaped and generally planar, with each element thereof being selectively contoured to provide an arcuate and a convexly shaped outer margin 42 and an arcuate and concavely shaped inner margin 44. The surface engaging elements 40 which are suitably constituted of vinyl outer layers 45 of any desired color or decorative motif and a resilient intermediate layer of insulating batting 46 are joined, as by sewing, to each other along their marginal concave edges 44 and the so joined exposed margins are desirably concealed by an exteriorly disposed strip or band element 47 which is preferably joined to the surface engaging elements on either side of these joined margins, as by sewing 44b. The band 47 is sized to extend from one terminal end of the holder, to and beyond the other terminal end thereof to provide an extending tab portion 48. This tab portion 48 has an elongated strip 50 of pressure engageable fastening material such as VELCRO secured to the inner side thereof. The complemental mating fastening material 52 engageable therewith is secured to the outer surface of the band 47 adjacent the other terminal end thereof. Specific details of suitable fastening materials of the type noted may be had from U.S. Pats. Nos. 2,717,437 and 3,114,951. Because the interengagement of any substantial portion of these complemental fastening materials will effectively secure the holder in the desired position about the neck of the coffeemaker as shown in FIG. 1, the effective circumference of the formed holder can be varied by an amount substantially equal to the total length of these two complemental fastening material strips employed. In the preferred embodiment the length X of the complemental parts are equal. To assure flexibility of usable dimension the strip 50 secured to the tab 47 is spaced from the terminal end of the joined surface engaging elements 40 by substantially the length of the other one 52 of the complemental strips. Accordingly, by selectively choosing the length of the extending tab 47 and the length of the complementally engageable strips of the fastening material the holder can be suitably adapted for utilization with coffeemakers having various neck sizes.

The radius of curvature $R_1$ of the concave arcuate marginal edge portions 44 of each of the surface engaging elements 40 (FIG. 2) is selectively shosen to be substantially larger than the radius of curvature of the circular neck opening of the largest sized coffeemaker with which the holder is adapted to be used.

When the radius of curvature of the band 47 is equal to $R_1$ the surface engaging portions 40 will be disposable in substantially parallel relationship for storage or packaging.

As the radius of curvature of the band is reduced as illustrated at $R_2$ (FIG. 3), as would occur when the holder is being mounted on a coffeemaker, the surface engaging portions 40 are automatically angularly displaced about the band 47. The final radius of curvature of the band, which is established when the band is secured about the neck of the coffeemaker (FIG. 1) is normally chosen by selective degree of overlay of the above described fastening strips 50, 52 so that the angle of flare of these surface engaging portions 40 will be substantially equal to the corresponding slope of the coffeemaker body portions on either side of the neck 34 thereof, whereby the surface portions will be rotated and displaced into substantially interfacial engagement therewith.

While, as in the illustrated presently preferred embodiments, the surface engaging portions 40 are generally similar in size and have arcuate outer marginal edges, it is within the teachings of the present invention to make such elements of any desired configuration to facilitate manual engagement therewith or to enhance the decorative aspects thereof.

Having thus described my invention what I claim is:

1. A protective holder adapted to be positioned proximate the circular vertex of a filter-type coffeemaker having bowed-in side walls comprising a pair of planar surface engaging elements each including a concave inner margin, means for joining said pair of planar surface engaging elements adjacent their respective inner concave margins.

the radius of curvature of said concave inner margins of said planar surface engaging elements being substantially larger than the radius of curvature of the circular vertex of the filter-type beverage maker on which it is adapted to be mounted whereby said pair of planar elements can be positioned in substantially overlapping parallel relation with the radius of curvature of the joined inner margins is equal to the radius of curvature of the inner margin of each of said planar elements and said pair of planar elements can be automatically angularly displaced away from each other about said joined inner margins into engagement with the bowed-in walls of the beverage maker when the protective holder is placed in position proximate the circular vertex of the coffeemaker and the radius of curvature of said joined marginal edges is reduced to the radius of curvature of the vertex of the coffeemaker, and fastening means for securing said protective holder in position about the circular vertex of the filter-type coffeemaker.

2. A protective holder according to claim 1 wherein said fastening means comprises a VELCRO fastener.

3. A protective holder according to claim 2, wherein said pair of planar elements include vinyl outer layers and an intermediate layer of insulating material.

4. A protective holder according to claim 2, further comprising band means fixedly secured to said pair of planar elements for concealing the joined inner margins thereof.

5. A protective holder according to claim 4, wherein said band means extends beyond said pair of planar elements forming a projecting tab, said tab means including one of the complemental portions of said fastening means.

6. A protective holder according to claim 4 wherein said one of the complemental portions of said fastening means is secured to the end portion of said projecting tab and said projecting tab is longer than the length of said one component by an amount substantially equal to the length of the other one of said complemental portions whereby said protective holder can be utilized with a plurality of coffeemakers having a variety of selectively sized neck openings.

7. A protective holder according to claim 5, wherein each of said pair of planar elements include a convex outer margin.

8. A protective holder according to claim 7, wherein said pair of planar elements include vinyl outer layers and an intermediate layer of insulating material.

* * * * *